United States Patent
Alvarez Redondo et al.

(10) Patent No.: US 12,281,633 B2
(45) Date of Patent: Apr. 22, 2025

(54) ROTOR BLADE OF A WIND TURBINE AND WIND TURBINE

(71) Applicant: Siemens Gamesa Renewable Energy Innovation & Technology S.L., Sarriguren (ES)

(72) Inventors: Jorge Alvarez Redondo, Madrid (ES); Iñaki Hermosilla Azanza, Navarra (ES); Nicolas Rojo Saiz, Navarra (ES)

(73) Assignee: Siemens Gamesa Renewable Energy Innovation & Technology S.L., Sarriguren (ES)

( * ) Notice: Subject to any disclaimer, the term of this patent is extended or adjusted under 35 U.S.C. 154(b) by 0 days.

(21) Appl. No.: 18/026,609

(22) PCT Filed: Sep. 13, 2021

(86) PCT No.: PCT/EP2021/075082
§ 371 (c)(1),
(2) Date: Mar. 16, 2023

(87) PCT Pub. No.: WO2022/063617
PCT Pub. Date: Mar. 31, 2022

(65) Prior Publication Data
US 2023/0374970 A1 Nov. 23, 2023

(30) Foreign Application Priority Data

Sep. 25, 2020 (EP) .................................... 20382851

(51) Int. Cl.
*F03D 1/06* (2006.01)
(52) U.S. Cl.
CPC ........ *F03D 1/0675* (2013.01); *F05B 2230/23* (2013.01); *F05B 2240/302* (2013.01);
(Continued)

(58) Field of Classification Search
CPC ...... F03D 1/0641; F03D 1/0675; F03D 13/10; F05B 2240/302
See application file for complete search history.

(56) References Cited

U.S. PATENT DOCUMENTS 9,506,452 B2 * 11/2016 Bakhuis .................. F03D 13/10
2006/0127222 A1 * 6/2006 Arelt ...................... F03D 1/0675
416/224

(Continued)

FOREIGN PATENT DOCUMENTS

EP 2243955 A2 10/2010
EP 3418558 A1 12/2018
(Continued)

OTHER PUBLICATIONS

PCT International Search Report and Written Opinion of International Searching Authority mailed Dec. 10, 2021 corresponding to PCT International Application No. PCT/EP2021/075082 filed Sep. 13, 2021.

*Primary Examiner* — Kenneth Bomberg
*Assistant Examiner* — Cameron A Corday
(74) *Attorney, Agent, or Firm* — Schmeiser, Olsen & Watts, LLP

(57) ABSTRACT

A rotor blade of a wind turbine includes a first rotor blade segment having a first shell portion, a second rotor blade segment having a second shell portion and a joint connecting the first rotor blade segment with the second rotor blade segment between the first shell portion and the second shell portion, whereby the rotor blade further includes a fairing, the fairing covering the joint and being attached to the first shell portion and the second shell portion by means of an adhesive. Further provided is a wind turbine having this rotor blade.

14 Claims, 3 Drawing Sheets

(52) U.S. Cl.
CPC ... *F05B 2240/303* (2020.08); *F05B 2240/304* (2020.08); *F05B 2260/301* (2013.01)

(56) References Cited

U.S. PATENT DOCUMENTS

| | | | | |
|---|---|---|---|---|
| 2007/0290118 | A1* | 12/2007 | Stiesdal | F03D 1/0675 290/55 |
| 2010/0272570 | A1* | 10/2010 | Arocena De La Rua | F03D 80/30 416/146 R |
| 2011/0142667 | A1* | 6/2011 | Miebach | F03D 13/10 416/223 R |
| 2011/0243736 | A1 | 10/2011 | Bell | |
| 2012/0141287 | A1* | 6/2012 | Hynum | F03D 1/0675 416/235 |
| 2014/0169978 | A1* | 6/2014 | Livingston | F03D 1/0675 264/263 |
| 2018/0304989 | A1* | 10/2018 | Lage | B29C 70/446 |
| 2018/0372068 | A1* | 12/2018 | Danielsen | F03D 13/10 |

FOREIGN PATENT DOCUMENTS

| | | | |
|---|---|---|---|
| WO | 2006056584 | A1 | 6/2006 |
| WO | 2016198075 | A1 | 12/2016 |
| WO | WO-2018142370 | A1 * | 8/2018 |

* cited by examiner

ROTOR BLADE OF A WIND TURBINE AND WIND TURBINE

CROSS-REFERENCE TO RELATED APPLICATIONS

This application claims priority to PCT Application No. PCT/EP2021/075082, having a filing date of Sep. 13, 2021, which claims priority to EP Application No. 20382851.2, having a filing date of Sep. 25, 2020, the entire contents both of which are hereby incorporated by reference.

FIELD OF TECHNOLOGY

The following relates to a rotor blade of a wind turbine and to a wind turbine having the rotor blade.

BACKGROUND

One way to produce more power using a wind turbine under given wind conditions is to increase the size of the rotor blades. However, the manufacturing of rotor blades and their transportation to wind harvesting sites is particularly difficult for large rotor blade sizes.

To resolve this issue, rotor blades may be manufactured segment-wise and joined on-site. Such designs of rotor blades may be referred to as split blades. The rotor blade segments are typically joined to each other either by bonding, bolting or by a combination of both. Such a joint has to be sufficiently strong to withstand the forces acting on the wind turbine blade during operation of the wind turbine. The joint is therefore connected to the load-carrying spar of the rotor blade.

To establish the joint of the rotor blade segments, the rotor blade segments must be accessible at the location of the joint. Therefore, the portions of the rotor blade segments surrounding the joint typically do not have a portion of the shell otherwise surrounding the spar of the rotor blade segments surrounding the joint. However, this gap between shell portions of the rotor blade segments must be closed to provide for the required aerodynamic properties of the shell of the rotor blade. For this purpose, a fairing is attached to the shell portions of the rotor blade segments at the location of the joint.

Typically, the fairing is attached to the shell portions of the rotor blade segments by means of multiple bolts. However, such an attachment requires very tight manufacturing tolerances in the location of the multiple bolts, resulting in a complex assembly on site and likely failure of the attachment due to load concentration at specific ones of the multiple bolts during operation of the wind turbine.

SUMMARY

Accordingly, an aspect relates to provide an improved rotor blade of a wind turbine with rotor blade segments, which does not have the disadvantages associated with the known solution from the state of art, in particular providing for a simple and secure installation of the fairing.

According to a first aspect of embodiments of the invention, the aspect is solved by means of a rotor blade of a wind turbine, the rotor blade comprising a first rotor blade segment having a first shell portion, a second rotor blade segment having a second shell portion and a joint connecting the first rotor blade segment with the second rotor blade segment between the first shell portion and the second shell portion, whereby the rotor blade further comprises a fairing, the fairing covering the joint and being attached to the first shell portion and the second shell portion by means of an adhesive.

Accordingly, embodiments of the invention provide for an installation of the fairing at the rotor blade by connecting the fairing to shell portions of the rotor blade segments via an adhesive. The adhesively attached fairing allows for a connection being less stiff than a connection comprising multiple joints and for a better load distribution at the connection, whereby a more robust connection is achieved. The inventors have found that the fairing is no structural part with the purpose of carrying loads but rather for providing aerodynamic characteristics and thus does not require the relatively stiff and complex attachment by means of the multiple bolts according to the state of the art. The lower stiffness of the solution provided by means of the adhesive allows the fairing not to absorb high structural loads coming from the deformation and displacement of the rotor blade segments to which it is connected. The employed adhesive should be a low-stiffness adhesive. Compared to providing multiple bolts, the solution of adhering the fairing to the shell portions is also much simpler on site because it removes the need for coordinating and fastening the multiple bolts. Further, the solution of embodiments of the invention has a lower cost compared to the fastening by means of the multiple bolts.

The adhesive may be an elastomeric adhesive. The elastomeric adhesive provides elasticity, low tensile and shear modulus, great compressive strength and vibration and dampening control. Thereby, the elastomeric adhesive may provide for particularly good load distribution along the attachment of the fairing to the shell portions.

The adhesive may be a rubber-based adhesive. The adhesive may in particular be a silicone-based adhesive. These types of adhesive provide for a particularly low stiffness and thereby allows the fairing not to absorb high structural loads coming from the deformation and displacement of the rotor blade segments to which it is connected.

Moreover, the adhesive may be configured to cure at ambient temperature. Ambient temperature may be in the range of 4° C. to 30° C., in particular in the range of 15° C. to 24° C. Thereby, the curing of the adhesive may be performed very simply on site.

Also, the first shell portion and the second shell portion may comprise flange portions. These flange portions may be located at facing ends of the first shell portion and the second shell portion, i.e. an end of the first shell portion facing an end of the second shell portion. The fairing is attached to the flange portions of the first shell portion and the second shell portion. The flange portions thereby provide for a particularly robust and easy attachment of the fairing to the shell portions.

Therein, the fairing may be bonded to bonding surfaces of the flange portions by means of bonding portions of the adhesive. The bonding portions of the adhesive mainly provide for the adhesion of the fairing to the bonding surfaces of the flange portions. The bonding portions may be provided as one or multiple layers of the adhesive. The layer may be a strip of the adhesive, for example.

Further, therein, the fairing may be sealed against sealing surfaces of the flange portions by means of sealing portions of the adhesive. The sealing portions of the adhesive mainly provide for the sealing of gaps between the fairing and the sealing surfaces of the flange portions. The sealing thereby provides for a better surface finishing at the transition from the fairing to the shell portions and avoids ingress of water and debris into the gaps. The gaps to be filled by the sealing portions may result from undersizing the fairing such that the installation has little manufacturing tolerances and can be performed more easily. The sealing portions may be provided as one or multiple layers of the adhesive. The layer may be a strip of the adhesive, for example.

The overall surface area of the sealing surfaces may be less than the overall surface area of the bonding surfaces. That is, because the fairing may be relatively thin and the sealing surfaces are provided mainly for sealing, and the sealing surfaces provided for the fairing may be small. However, to provide proper adhesion of the fairing to the sealing surfaces, the sealing surfaces may be larger than the bonding surfaces.

The bonding and the sealing of the fairing to the shell portions may be achieved by the same adhesive. This further allows for a particularly simple installation of the rotor blade on site due to not requiring to provide different materials and distinguish between them.

Also, the first rotor blade segment may be an inboard blade segment and the second rotor blade segment may be an outboard blade section. Such a rotor blade design may also be referred to as a two-segment split blade design, meaning that the rotor blade consists of two segments, whereby one is inboard and the other one is outboard. The inboard blade segment comprises the hub and the outboard blade segment comprises the tip of the rotor blade.

Further, the fairing may be made from at least two fairing plates, in particular at least four or at least five fairing plates. Each of the fairing plates may have a longitudinal extension around the joint. The fairing plates may have a rounded shape so as to adapt to the shape of the shell of the rotor blade. The fairing plates may be arranged in a row along a circumference of the rotor blade or around the joint. Along the row, the fairing plates may be respectively connected to each other, e.g. by means of the adhesive. The provision of multiple fairing plates provides for easy accessibility to the space inside of the rotor blade at the location of the fairing. Instead of removing the entire fairing, merely one fairing plate of the fairing may be removed. The thereby facilitated access may be used for inspection purposes, e.g. to inspect the joint. Also, when the fairing gets damaged, only the fairing plate or fairing plates having the damage need to be removed instead of the entire fairing.

In particular, the fairing plates may be sealed against each other by means of an adhesive. The adhesive may be of the same type or the same one as used for the attachment of the fairing to the shell portions. The sealing prevents ingress of water and debris into the space inside of the rotor blade.

Further, at least one fairing plate of the at least two fairing plates may be bonded to the at least other one fairing plate of the at least two fairing plates by means of an adhesive and to a bonding surface thereof. The adhesive may be of the same type or the same one as used for the attachment of the fairing to the shell portions. The bonding surface of the fairing plate may be an interior surface inside of the rotor blade, i.e., the bonding surface is not on the outside and not visible but provided only for creating the bond between the fairing plates. Thereby, the bonding surface of the fairing plate may extend under the other fairing plate to which it is bonded by means of the adhesive. Thereby, a particularly robust fairing may be provided.

Also, one fairing plate of the at least two fairing plates may be attached to the first shell portion and the second shell portion by means of a weaker adhesive than the at least one other fairing plate of the at least two fairing plates. This provides for particularly easy accessibility to the space inside of the rotor blade at the location of the fairing attached to the shell portions with the weaker adhesive for inspection purposes because the weaker adhesive may be removed more easily.

Moreover, a leading edge fairing plate of at least four fairing plates may be located at a leading edge of the rotor blade, a trailing edge fairing plate of the at least four fairing plates may be located at a trailing edge of the rotor blade, a suction side fairing plate of the at least four fairing plates may be located at the suction side of the rotor blade and a pressure side fairing plate of the at least four fairing plates may be located at the pressure side of the rotor blade. There may also be further fairing plates, e.g., two fairing plates at the suction side. The design of providing fairing plates at each one of the leading edges, the trailing edge, the suction side and the pressure side provide for particularly well accessibility of the inside of the rotor blade from the side which is most relevant for the inspection. Further, it has been found that such a design provides very good aerodynamic characteristics and overall stability of the fairing.

The trailing edge fairing plate may have a sharp geometry. It may further comprise a trailing edge reinforcement part in between opposite sides of the trailing edge fairing plate. The trailing edge reinforcement part may be from any suitable material to reinforce the trailing edge fairing plate such as wood or balsa, for example. The trailing edge reinforcement part may be in the form of a wedge. The trailing edge reinforcement part may be attached to the trailing edge fairing plate by means of an adhesive, in particular the same adhesive as used for the attachment of the fairing to the shell portions.

According to a second aspect of embodiments of the invention, the aspect is solved by means of a wind turbine having at least one rotor blade according to the first aspect of embodiments of the invention.

BRIEF DESCRIPTION

Some of the embodiments will be described in detail, with reference to the following figures, wherein like designations denote like members, wherein.

DETAILED DESCRIPTION

Figure 1:
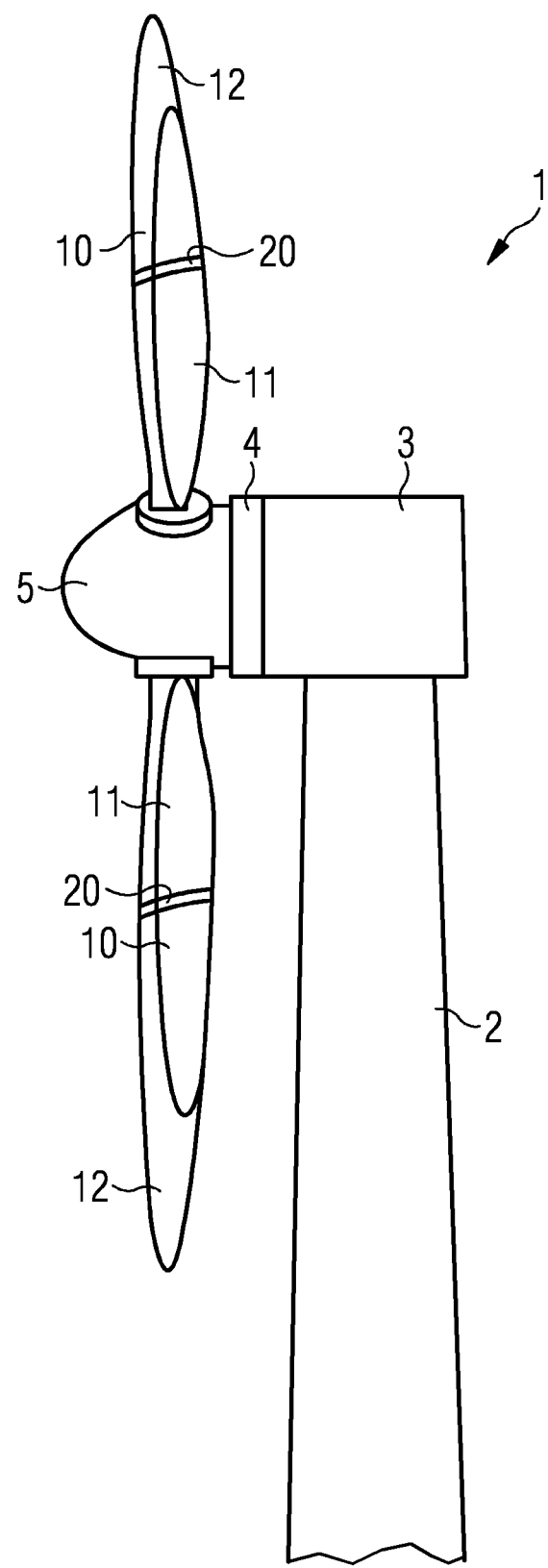
FIG. 1 shows a side view on a wind turbine.

FIG. 1 shows a side view on a wind turbine 1. The wind turbine 1 comprises a supporting tower 2 and a nacelle 3, whereby the nacelle 3 is attached to the supporting tower 2. The wind turbine 1 further comprises a generator 4 attached to a rotor 5 of the wind turbine 1.

Two rotor blades 10, which may alternatively be referred to as wind turbine blades, are attached to the rotor 5. However, the number of rotor blades 10 may alternatively be more than two, such as three, for example.

Figure 2:
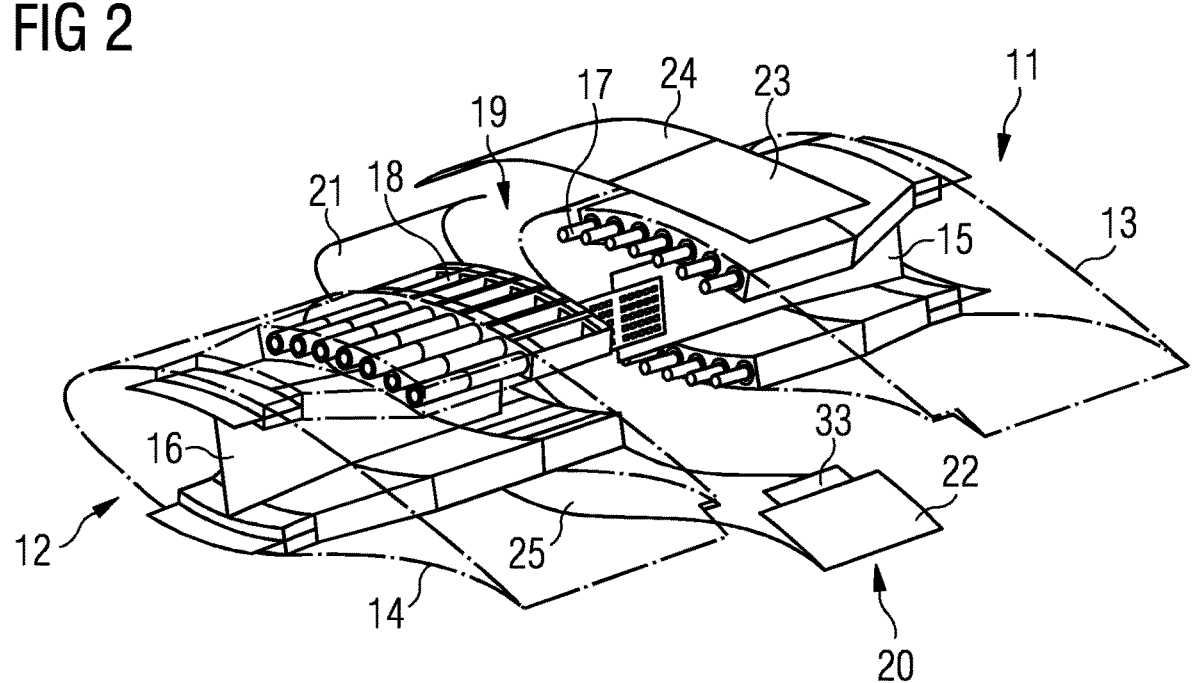
FIG. 2 shows a side perspective view on a part of an assembly of a rotor blade of FIG. 1.

Each one of the rotor blades 10 has a first rotor blade segment 11 and a second rotor blade segment 12. The first rotor blade segment 11 is an inboard blade segment, whereas the second blade segment 12 is an outboard blade segment. The two rotor blade segments 11, 12 are joined on site when installing them in the wind turbine 1. A joint 19 as shown in FIG. 2 can be employed for joining the rotor blade segments 11, 12 with each other. After joining the rotor blade segments 11, 12 with each other, a fairing 20 may be provided at the circumference of the shell of the rotor blades 10 to cover the joint 19 and close the gap between the rotor blade segments 11, 12 and their shell portions provided for establishing the joint during assembly.

FIG. 2 shows a side perspective view on a part of an assembly of one of the rotor blades 10 of the wind turbine 1. The rotor blade segments 11, 12 are shown here only partially. The first rotor blade segment 11 has a first shell portion 13 and the second rotor blade segment 12 has a second shell portion 14. The first rotor blade segment 11 further has a first spar section 15 and the second rotor blade segment 12 has a second spar section 16. These spar sections 15, 16 must be joined with each other so that the rotor blade segments 11, 12 become the structurally integral rotor blade 10.

For this purpose, in this rotor blade 10, a joint 19 is being formed by multiple bolts 17 and corresponding inserts 18. However, alternatively or additionally to the bolting, the joint 19 may be formed by bonding. To provide the work space at the joint 19 for the joining of the spar sections 15, 16 with each other, the shell portions 13, 14 do not entirely extend over the whole joint 19. Instead, after establishing the joint 19, there is a gap between the shell portions 13, 14. This gap must be closed to avoid aerodynamic disturbances of the rotor blade 10.

For this purpose, the fairing 20 is provided as shown in the assembly of the rotor blade 10 according to FIG. 2. The fairing 20 closes the gap between the shell portions 13, 14. Thereby, the fairing 20 extends around the joint 19 structurally connecting the spar sections 15, 16.

In this particular embodiment, the fairing 20 comprises five fairing plates 21, 22, 23, 24, 25. However, the number of fairing plates 21, 22, 23, 24, 25 may alternatively be less or more. These fairing plates 21, 22, 23, 24, 25 consist of a leading edge fairing plate 21 located at a leading edge of the rotor blade 10, a trailing edge fairing plate 22 located at a trailing edge of the rotor blade 10, a suction side fairing plate 24 located at the suction side of the rotor blade 10, a pressure side fairing plate 25 located at the pressure side of the rotor blade 10 and a suction side-trailing edge fairing plate 23 located near the trailing edge and on the suction side of the rotor blade 10.

Easy access to the joint 19 is possible by simply removing one or more of the fairing plates 21, 22, 23, 24, 25 as required. Further, easy replacement of damaged fairing plates 21, 22, 23, 24, 25 is possible.

Figure 3:
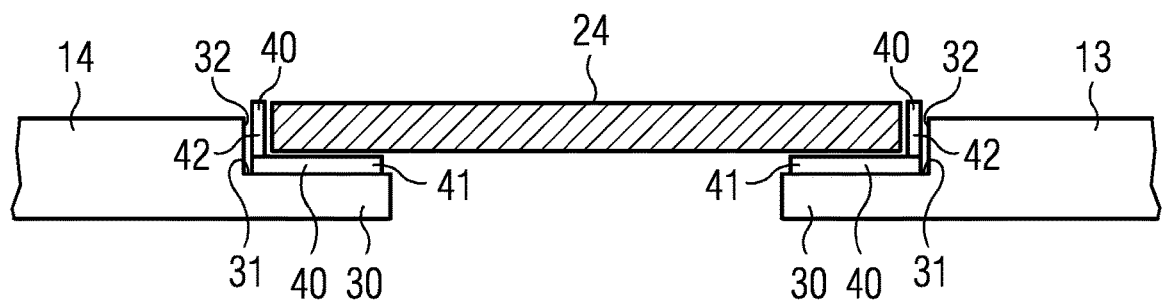
FIG. 3 shows a sectional cut through a shell of the assembled rotor blade of FIG. 2 at the location of the fairing.

Each one of the fairing plates 21, 22, 23, 24, 25 is attached to both shell portions 13, 14 by means of an adhesive 40 as shown in FIG. 3. FIG. 3 shows a sectional cut through the shell of the assembled rotor blade 10 of FIG. 2 at the location of the fairing 20. The shell is being formed by both shell portions 13, 14 and the fairing 20. Again, the shell portions 13, 14 are only shown partially in this figure.

From FIG. 3 it can be taken that both shell portions 13, 14 have flange portions 30 facing each other. The flange portions 30 have a step from the outer surface of the shell portions 13, 14. The step is formed into the direction of the joint 19 or inside of the rotor blade 10. Each of these flange portions 30 has a bonding surface 31 and a sealing surface 32. The bonding surface 31 is perpendicular to the sealing surface 32. The fairing 20 is inserted in between the flange portions 30 of the shell portions 13, 14 after the joint 19 has been established.

In FIG. 3, the cut goes through the shell portions 13, 14 at the location of the suction side fairing plate 24. However, every one of the fairing plates 21, 22, 23, 24, 25 is attached to the shell portions 13, 14 as shown in FIG. 3. That is, adhesive 40 is provided as bonding portions 41 at the bonding surfaces 31 and as sealing portions 42 at the sealing surfaces 32 to provide a low-stiffness bond of the fairing plates 21, 22, 23, 24, 25 to the shell portions 13, 14 and to provide a proper seal in between the fairing plates 21, 22, 23, 24, 25 and the shell portions 13, 14. The adhesive 40 used herein is an elastomeric adhesive and configured to cure at ambient temperature. The bonding portions 41 and the sealing portions 42 may have protuberances to assure a fix thickness of the adhesive 40 for the attachment.

Figure 4:
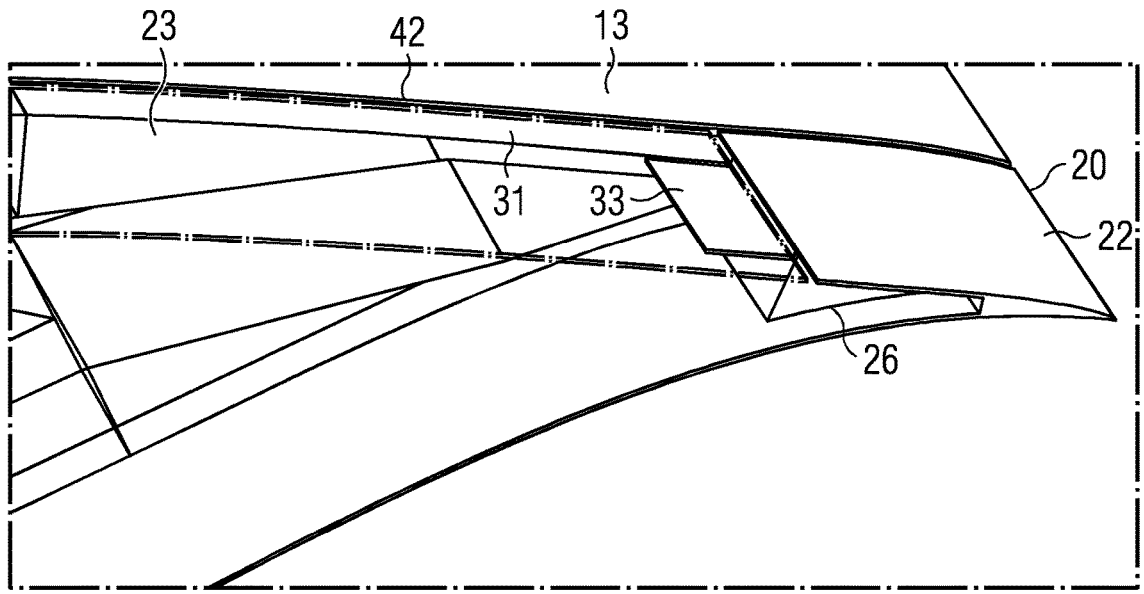
FIG. 4 shows a side perspective view on a part of an assembly of the rotor blade of FIG. 2 including a fairing.

FIG. 4 shows a side perspective view on a part of an assembly of the rotor blade 10 of FIG. 2 including the fairing 20 with its fairing plates 23 and 22. As can be taken from this perspective particularly well, the trailing edge fairing plate 22 has the sharp trailing edge of the rotor blade 10. In between two opposing sides of this fairing plate 22, a trailing edge reinforcement part 26 in the shape of a wedge is inserted to stabilize the trailing edge of the fairing 20.

Further, the trailing edge fairing plate 22 has a bonding surface 33 extending towards the adjacent fairing plate 23. In fact, the bonding surface 33 is bonded by means of the adhesive 40 to an underside of the fairing plate 23, whereby the fairing plate 22 is adhered to the fairing plate 23.

Figure 5:
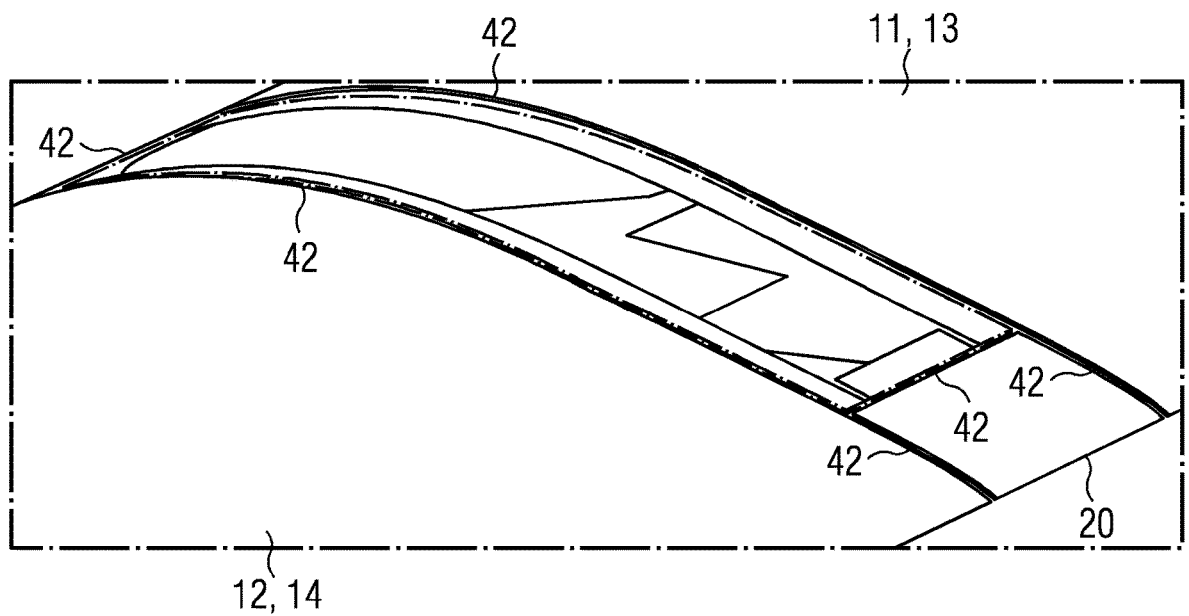
FIG. 5 shows a side perspective view on the part of the assembled rotor blade of FIG. 2.

FIG. 5 shows a side perspective view on the part of the assembled rotor blade 10 of FIG. 2. The fairing 20 is attached to both shell portions 13, 14 of the rotor blade segments 11, 12. Indicated are the sealing portions 42 of the adhesive 40 providing a proper seal of the fairing 20 with the shell portions 13, 14 and further a proper seal of the fairing plates 21, 22, 23, 24, 25 with each other.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A rotor blade of a wind turbine, the rotor blade comprising:
   a first rotor blade segment having a first shell portion, a second rotor blade segment having a second shell portion, and a joint connecting the first rotor blade segment with the second rotor blade segment between the first shell portion and the second shell portion,
   wherein the joint includes multiple bolts and corresponding inserts,
   wherein the rotor blade further comprises a fairing, the fairing covering the joint and being attached to the first shell portion and the second shell portion by means of an adhesive, wherein the adhesive is an elastomeric adhesive, wherein a leading edge fairing plate of at least four fairing plates is located at a leading edge of the rotor blade, a trailing edge fairing plate of the at least four fairing plates is located at a trailing edge of the rotor blade, a suction side fairing plate of the at least four fairing plates is located at the suction side of the rotor blade, and a pressure side fairing plate of the at least four fairing plates is located at the pressure side of the rotor blade, and wherein the trailing edge fairing plate has a sharp geometry and comprises a trailing edge reinforcement part in between opposite sides of the trailing edge fairing plate.

2. The rotor blade according to claim 1, wherein the adhesive is a rubber-based adhesive.

3. The rotor blade according to claim 2, wherein the rubber-based adhesive, is a silicone-based adhesive.

4. The rotor blade according to claim 1, wherein the adhesive is configured to cure at ambient temperature.

5. The rotor blade according to claim 1, wherein the first shell portion and the second shell portion comprise flange portions at facing ends thereof, wherein the fairing is attached to the flange portions.

6. The rotor blade according to claim 5, wherein the fairing is bonded to bonding surfaces of the flange portions by means of bonding portions of the adhesive.

7. The rotor blade according to claim 5, wherein the fairing is sealed against sealing surfaces of the flange portions by means of sealing portions of the adhesive.

8. The rotor blade according to claim 1, wherein the first rotor blade segment is an inboard blade segment and the second rotor blade segment is an outboard blade section.

9. The rotor blade according to claim 1, wherein the fairing plates are sealed against each other by means of an adhesive.

10. The rotor blade according to claim 1, wherein at least one fairing plate of the at least four fairing plates is bonded to at least one other fairing plate of the at least four fairing plates by means of an adhesive and to a bonding surface thereof.

11. The rotor blade according to claim 1, wherein one fairing plate of the at least four fairing plates is attached to the first shell portion and the second shell portion by means of a weaker adhesive than at least one other fairing plate of the at least four fairing plates.

12. A wind turbine having at least one rotor blade according to claim 1.

13. A rotor blade of a wind turbine, the rotor blade comprising:
a first rotor blade segment having a first shell portion,
a second rotor blade segment having a second shell portion,
a joint connecting the first rotor blade segment with the second rotor blade segment between the first shell portion and the second shell portion,
a fairing, the fairing covering the joint and being attached to the first shell portion and the second shell portion by means of an adhesive, wherein a leading edge fairing plate is located at a leading edge of the rotor blade, a trailing edge fairing plate is located at a trailing edge of the rotor blade, a suction side fairing plate is located at a suction side of the rotor blade, and a pressure side fairing plate is located at a pressure side of the rotor blade, and wherein the trailing edge fairing plate has a sharp geometry and comprises a trailing edge reinforcement part in between opposite sides of the trailing edge fairing plate.

14. The rotor blade according to claim 13, wherein the adhesive is an elastomeric adhesive.

* * * * *